(12) United States Patent
Hayek et al.

(10) Patent No.: US 6,442,632 B1
(45) Date of Patent: *Aug. 27, 2002

(54) SYSTEM RESOURCE ARBITRATION MECHANISM FOR A HOST BRIDGE

(75) Inventors: George Hayek, Cameron Park; Brian Langendorf, El Dorado Hills, both of CA (US); Aniruddha Kundu; Gary Solomon, both of Hillsboro, OR (US); Peter D. MacWilliams, Aloha, OR (US); James M. Dodd, Citrus Heights, CA (US)

(73) Assignee: Intel Corporation, Santa Clara, CA (US)

( * ) Notice: Subject to any disclaimer, the term of this patent is extended or adjusted under 35 U.S.C. 154(b) by 7 days.

This patent is subject to a terminal disclaimer.

(21) Appl. No.: 09/662,365

(22) Filed: Sep. 13, 2000

Related U.S. Application Data

(63) Continuation of application No. 08/924,209, filed on Sep. 5, 1997, now Pat. No. 6,212,589.

(51) Int. Cl.[7] .............................................. G06F 13/00
(52) U.S. Cl. ....................................................... 710/119
(58) Field of Search ................................. 710/100–129

(56) References Cited

U.S. PATENT DOCUMENTS

| 4,332,011 A | 5/1982 | Epstein et al. .............. 364/200 |
| 5,046,041 A | 9/1991 | Lecocq et al. .............. 364/200 |
| 5,133,062 A | 7/1992 | Joshi et al. .................. 395/500 |
| 5,193,194 A | 3/1993 | Gruender, Jr. et al. ...... 395/725 |
| 5,265,211 A | 11/1993 | Amini et al. ................ 395/325 |
| 5,379,384 A | 1/1995 | Solomon ..................... 395/325 |
| 5,396,602 A | 3/1995 | Amini et al. ................ 395/325 |
| 5,434,983 A | 7/1995 | Yaso et al. ................... 395/325 |
| 5,450,551 A | 9/1995 | Amini et al. ................ 395/299 |
| 5,517,650 A | 5/1996 | Bland .......................... 395/750 |
| 5,519,837 A | 5/1996 | Tran ............................ 395/291 |
| 5,519,838 A | 5/1996 | Ziegler et al. ............... 395/299 |
| 5,533,204 A | 7/1996 | Tipley ......................... 395/288 |
| 5,535,340 A | 7/1996 | Bell et al. .................... 395/292 |
| 5,546,546 A | 8/1996 | Bell et al. .................... 395/292 |
| 5,557,754 A | 9/1996 | Sone et al. ................... 395/287 |
| 5,581,782 A | 12/1996 | Sarangdhar et al. ........ 395/800 |
| 5,619,661 A | 4/1997 | Crews et al. ................ 395/299 |
| 5,713,025 A | 1/1998 | Molmar et al. ............. 395/729 |

*Primary Examiner*—David Wiley
(74) *Attorney, Agent, or Firm*—Blakely, Sokoloff, Taylor & Zafman LLP (57) ABSTRACT

A computer system is disclosed with a host bridge that arbitrates access to a system resource from a CPU via a host bus and from a set of bus agents via a peripheral bus. A separate set of priority classes are provided to the CPU and to the bus agents and programmable timers are included to tune system resource allocation between the host and processor busses.

7 Claims, 7 Drawing Sheets

SYSTEM RESOURCE ARBITRATION MECHANISM FOR A HOST BRIDGE

RELATED APPLICATIONS

This Application is a continuation of U.S. patent application Ser. No. 08/924,209, filed on Sep. 5, 1997, now a U.S. Pat. No. 6,212,589, which is a continuation of U.S. patent application Ser. No. 08/379,157, filed Jan. 27, 1995, now abandoned.

BACKGROUND OF THE INVENTION

1. Field of the Invention

The present invention pertains to the field of computer systems. More particularly, this invention relates to a system resource arbitration mechanism in a host bridge.

2. Background

Prior computer systems commonly include a central processing unit (CPU) that communicates with various computer system elements via a host bus. Prior computer systems may also include a peripheral bus that enables communication among a variety of peripheral components. Such a computer system typically includes a host bridge that enables communication between the host bus and the peripheral bus. Such a host bridge typically enables the CPU to access bus agents coupled to the peripheral bus and may enable the bus agents coupled to the peripheral bus to access system resources such as a main memory for the computer system.

Such a computer system typically implements an arbitration mechanism that coordinates accesses to system resources from the host bus and the peripheral bus. For example, such an arbitration mechanism is required to coordinate between main memory accesses by the CPU and main memory accesses by the various bus agents coupled to the peripheral bus. In addition, such an arbitration mechanism typically coordinates between accesses that originate with the CPU and that are targeted for a bus agent on the peripheral bus and accesses that originate on the peripheral bus that are targeted either for a system resource or another bus agent coupled to the peripheral bus.

One type of prior computer system implements a relatively simple arbitration mechanism that employs a set of hold/hold acknowledge bus control signals coupled to the CPU. Such a simple arbitration mechanism asserts the hold signal to the CPU whenever access to system resources is required by one of the bus agents coupled to the peripheral bus. The CPU usually responds to the hold signal from the arbitration mechanism by returning the hold acknowledge signal after completing activity underway on the host bus and any required data coherency transactions.

Such a hold/hold acknowledge implementation provides a relatively low cost arbitration mechanism for a computer system. Unfortunately, such simple hold/hold acknowledge arbitration mechanisms severely limit the performance of the computer system. For example, such arbitration mechanisms usually do not allow concurrent bus transactions over the host bus and the peripheral bus. In addition, such arbitration mechanisms usually do not allow communication between bus agents coupled to the peripheral bus while the CPU is accessing a system resource such as the main memory. Moreover, such a hold/hold acknowledge arbitration mechanism typically requires a long latency between the assertion of the hold signal by the arbitration mechanism and the hold acknowledge response by the CPU. Such long latencies decrease the overall bandwidth available for data transfer in such a system.

Other prior computer systems may implement relatively complex arbitration mechanism. For example, one such computer system employs an arbitration hold/back-off signaling protocol to the CPU on the host bus that allows full concurrent operation between the host bus and the peripheral bus. Such an arbitration hold/back-off signaling protocol typically decreases the latency required for the arbitration mechanism to gain control over the host bus. Unfortunately such an arbitration mechanism usually requires a relatively complex set of arbiter logic in order to ensure proper data flow and data coherency in the system. Such complex arbiter logic typically increases the overall cost of such a computer system.

SUMMARY OF THE INVENTION

One object of the present invention is to provide a host bridge with an arbiter that enables a CPU to access main memory while the host bridge completes data transfer posted by the CPU for transfer over the peripheral bus.

Another object of the present invention is to enable a CPU to main memory access to complete in parallel with the start of a main memory access that originates on the peripheral bus.

Another object of the present invention is to enable concurrency between CPU to main memory accesses and communication transactions on the peripheral bus between peripheral bus agent peers.

These and other objects are provided by a computer system that includes a system resource and a host bridge that enables access to the system resource from a CPU via a host bus and from a set of bus agents via a peripheral bus. The host bridge provides an arbiter that implements a separate set of priority classes to the CPU and to the bus agents on the peripheral bus for coordinating access to the system resource. For one embodiment, the priority classes for the CPU include a CPU high state and a CPU low state. The arbiter grants priority to the CPU while in the CPU high state and grants access to the separately prioritized bus agents on the peripheral bus while in the CPU low state. The host bridge includes a programmable latency timer that determines an amount of time that the CPU stays in the CPU high state and a programmable watchdog timer that indicates an inactivity time for the CPU for removing the CPU to the CPU low state.

Other features and advantages of the present invention will be apparent from the accompanying drawings, and from the detailed description that follows below.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Figure 1:
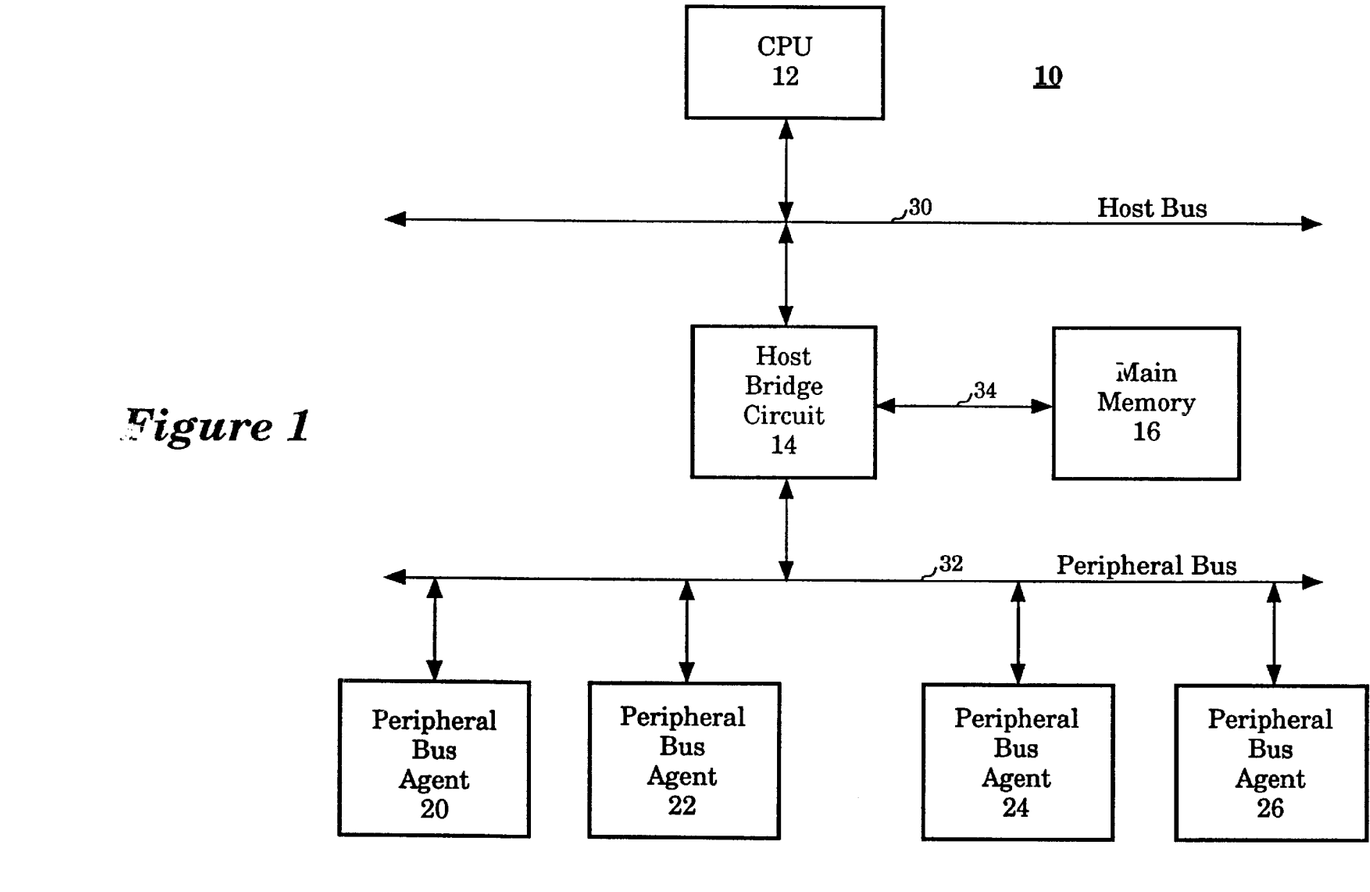
FIG. 1 illustrates a computer system for one embodiment which comprises a central processing unit (CPU), a host bridge circuit, a main memory, and a set of peripheral bus agents coupled to a peripheral bus.

FIG. 1 illustrates a computer system 10 for one embodiment. The computer system 10 comprises a central processing unit (CPU) 12, a host bridge circuit 14, a main memory 16, and a set of peripheral bus agents 20–26. The host bridge circuit 14 enables communication between the CPU 12 coupled to a host bus 30 and the peripheral bus agents 20–26 each coupled to a peripheral bus 32. The peripheral bus agents 20–26 may be referred to as peripheral bus peers.

The host bridge circuit 14 functions as a memory controller for the main memory 16. The host bridge circuit 14 enables read and write access to the main memory 16 from the host bus 30 and the peripheral bus 32. The host bridge circuit 14 coordinates accesses to the main memory 16 that originate on the peripheral bus 32 with accesses to the main memory 16 that originate on the host bus 30.

In addition, the host bridge circuit 14 functions as an arbiter for resources of the computer system 10 including the main memory 16. For example the host bridge circuit 14 arbitrates between requests from the CPU 12 and the peripheral bus agents 20–26 for access to the main memory 16 via a memory path 34.

The host bridge circuit 14 also functions as a bus bridge between the host bus 30 and the peripheral bus 32. The host bridge circuit 14 enables transactions originating on the host bus 30 to propagate to the peripheral bus 32. The host bridge circuit 14 also enables transaction originating on the peripheral bus 32 to propagate to the host bus 30.

Figure 2:
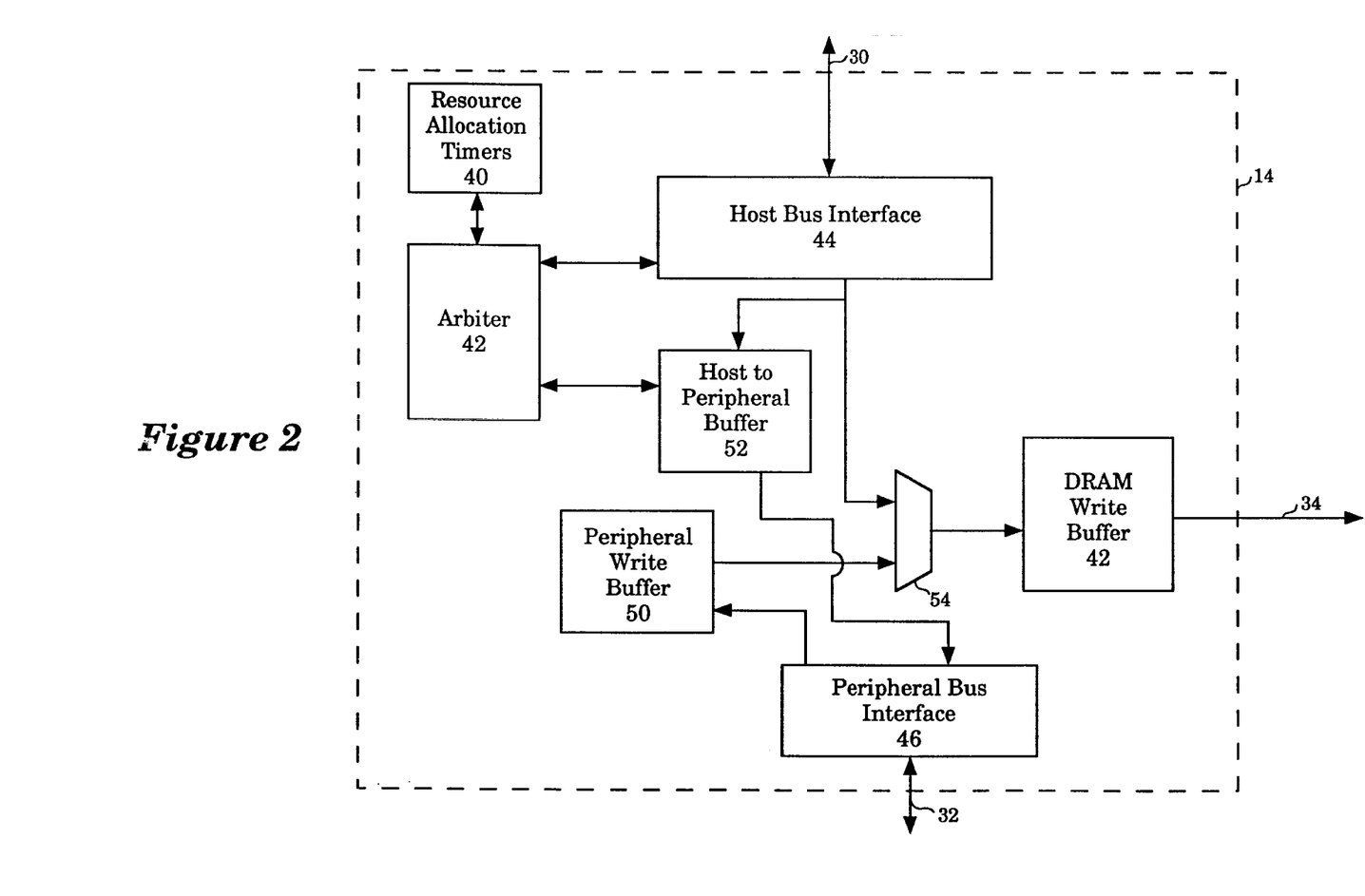
FIG. 2 illustrates the host bridge circuit for one embodiment which includes an arbiter that coordinates system resource access requests that originate on the host and peripheral busses.

FIG. 2 illustrates the host bridge circuit 14 for one embodiment. The host bridge circuit 14 includes a host bus interface 44 that enables communication over the host bus 30 and a peripheral bus interface 46 that enables communication over the peripheral bus 32. The host bridge circuit 14 further comprises an arbiter 42 that arbitrates between requests for access to system resources such as the main memory 16. The request may originate from agents coupled to the host bus 30 such as the CPU 12 or agents coupled to the peripheral bus 32 such as the peripheral bus agents 20–26.

The host bus interface 44 senses data transfer sequences such as read and write transactions that initiate on the host bus 30. The host bus interface 44 notifies the arbiter 42 of data transfer sequences that originate on the host bus 30 and that target for the main memory 16. The arbiter 42 then arbitrates such requests according to a priority of the CPU 12 as indicated by previous transactions to the main memory 16 from the peripheral bus 32 as well as timers maintained in a set of resource allocation timers 40. The resource allocation timers are programmable by the CPU 12 via the host bus 30 and allow the CPU 12 to tune the relative priorities for system resource allocation between the CPU 12 and the peripheral bus agents 20–26.

The host bus interface 44 transfers write data received over the host bus and targeted for the main memory 16 into a DRAM write buffer 48 through a multiplexer 54. In addition, the host bus interface 44 buffers or "posts" write data targeted for a bus agent coupled to the peripheral bus 32 in a host to peripheral buffer 52.

The peripheral bus interface 46 senses data transfer sequences such as read and write transactions that occur on the peripheral bus 32 and that originate from one of the peripheral bus agents 20–26. The peripheral bus interface 46 notifies the arbiter 42 of any data transfer sequences targeted for the main memory 16. The arbiter 42 arbitrates such requests based upon an independent rotating priority scheme for the peripheral bus agents 20–26 and the relative priority of the CPU 12. If a write transaction is granted by the arbiter 42, the peripheral bus interface 46 posts the write data received over the peripheral bus 32 into a peripheral write buffer 50. The data from the peripheral write buffer 50 is transferred into the DRAM write buffer 48 through the multiplexer 54 for transfer to the main memory 16 over the memory path 34.

Figure 3:
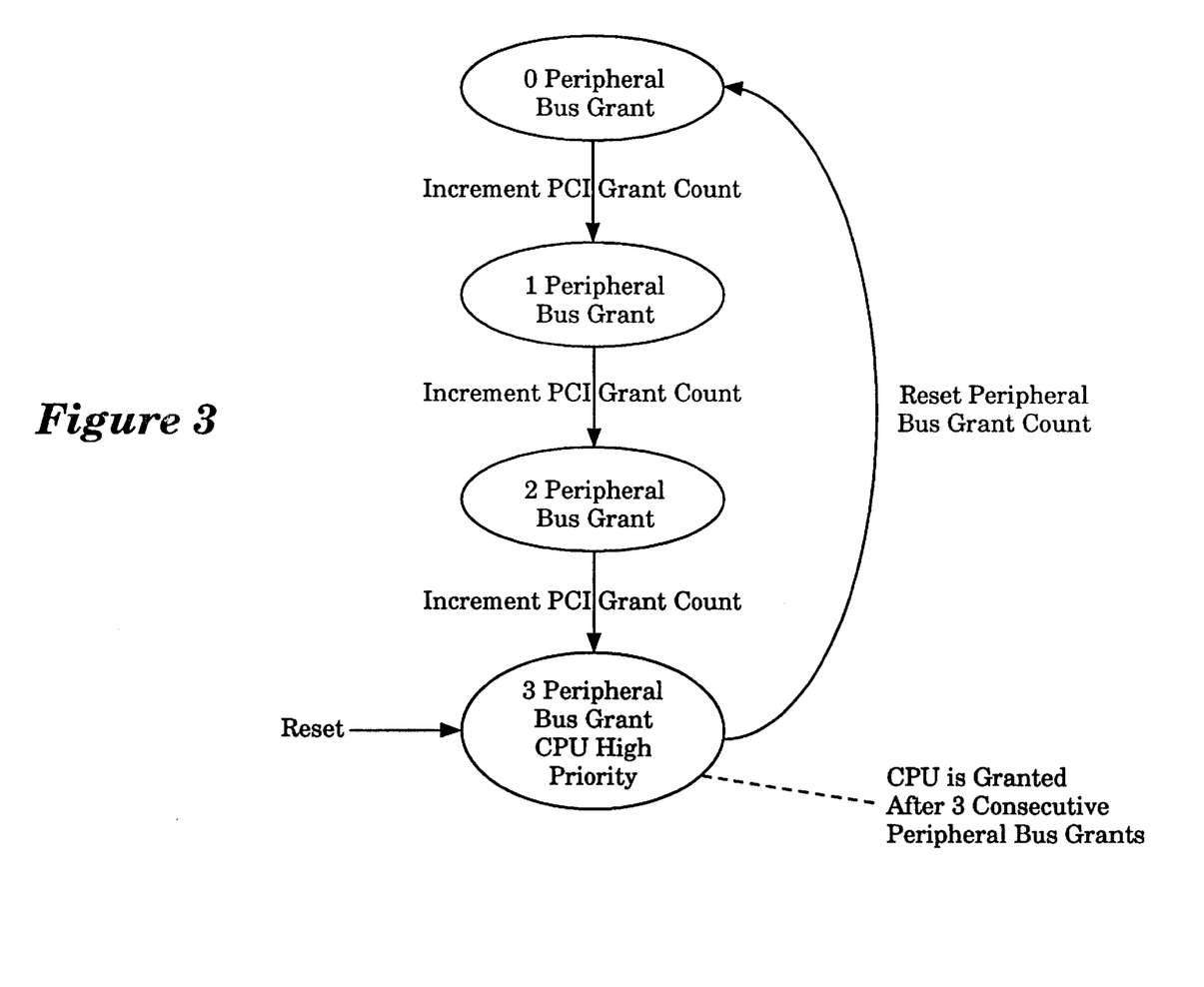
FIG. 3 illustrates the priority class implemented by the arbiter for access transactions to the main memory that originate from the CPU.

FIG. 3 illustrates the priority mechanism employed by the arbiter 42 for access transactions to the main memory 16 and the peripheral bus 32 that originate from the CPU 12. The arbiter 42 provides a separate priority scheme for the CPU 12. For one embodiment, the CPU 12 resides in either a CPU high priority state or a CPU low priority state. The CPU 12 wins arbitration over the peripheral bus agents 20–26 while in the CPU high priority state.

Upon a reset of the computer system 10, the CPU 12 assumes the CPU high priority state. In the CPU high priority state, the arbiter 42 grants priority access to the main memory 16 and the peripheral bus 32 for any accesses that originate from the CPU 12 via the host bus 30. The CPU 12 stays in the CPU high priority state for a time interval determined by a latency timer and a CPU watchdog timer contained in the resource allocation timers 40.

After the CPU 12 transitions to the CPU low priority state, the arbiter 42 grants priority access to the main memory 16 and the peripheral bus 32 to accesses that originate from one of the peripheral bus agents 20–26 over the peripheral bus 32. If no peripheral requests are present while the CPU 12 is in the CPU low priority state, the arbiter 42 grants priority access to the system resources to the CPU 12. The CPU 12 remains in the CPU low priority state until the arbiter 42 grants three accesses to the main memory 16 and the peripheral bus 32 from the peripheral bus 32. Three such grants to bus agents coupled to the peripheral bus 32 cause the CPU 12 to enter the CPU high priority state for the interval determined by the resource allocation timers 40.

Figure 4:
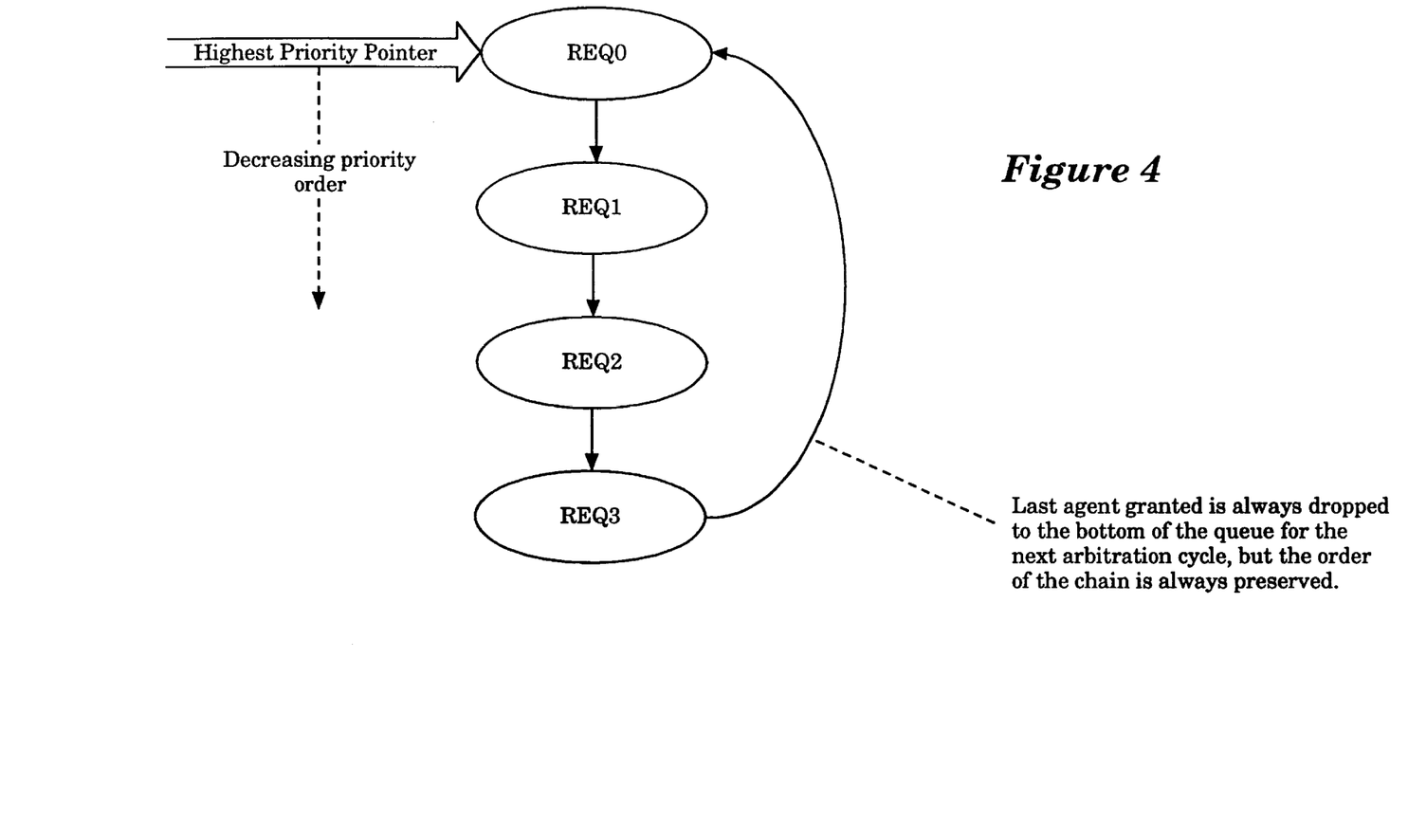
FIG. 4 illustrates the separate priority class for the peripheral bus agents coupled to the peripheral bus.

FIG. 4 illustrates the priority scheme for the peripheral bus agents 20–26. 26.The arbiter 42 provides a separate priority scheme for the bus agents coupled to the peripheral bus 32. The peripheral bus agents 20–26 correspond to bus requests REQ0–REQ3. The arbiter 42 maintains a rotating priority scheme for the peripheral bus agents 20–26. Each request from the peripheral bus agents 20–26 is arbitrated and according to the CPU high or CPU low priority state of the CPU 12 at the time of the request.

Figure 5:
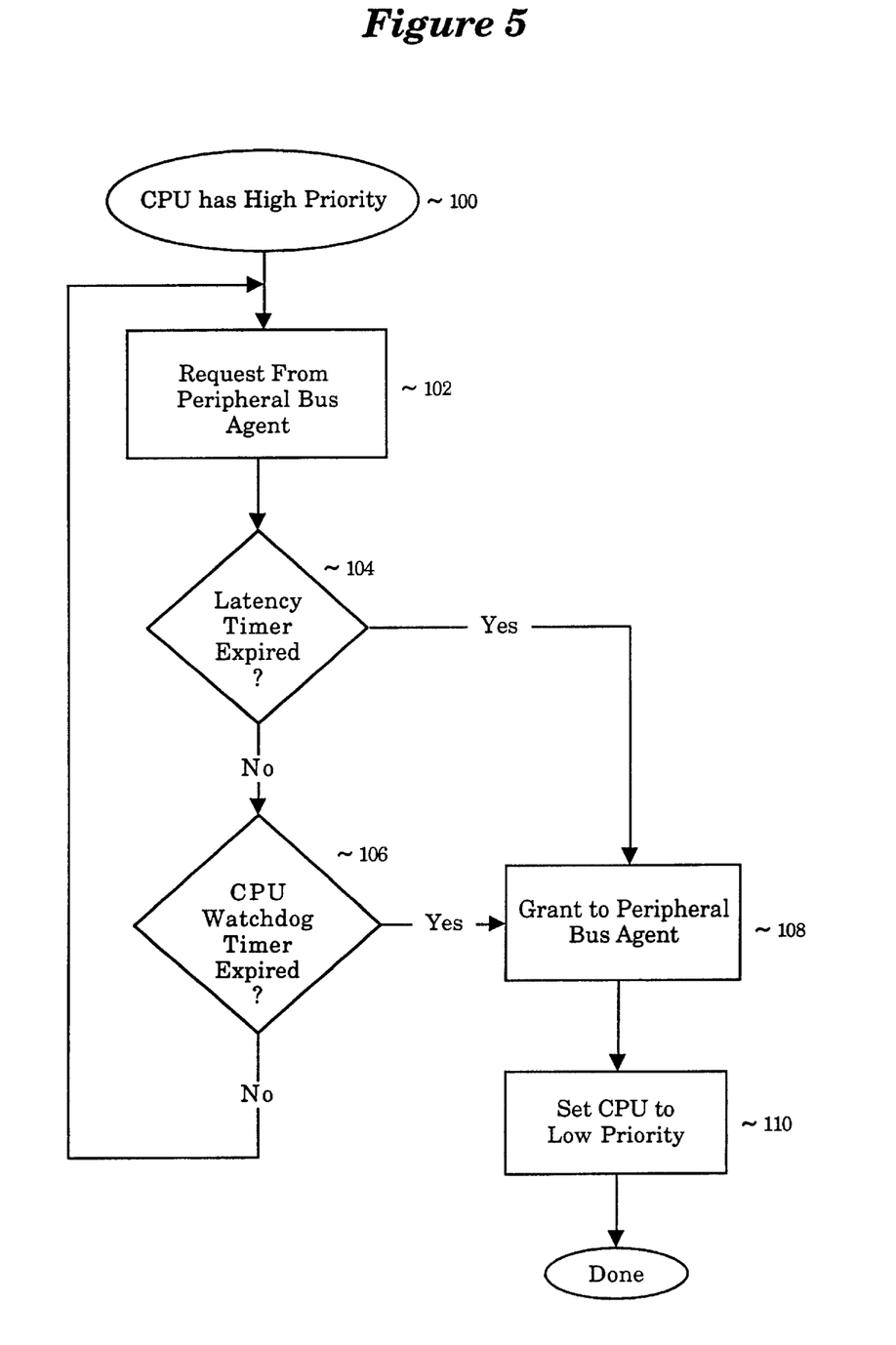
FIG. 5 illustrates arbitration by the arbiter in response to a request for the main memory or the peripheral bus while the CPU 12 is in the CPU high priority state.

FIG. 5 illustrates arbitration by the arbiter 42 in response to a request for the main memory 16 and the peripheral bus 32 via the peripheral bus 32 while the CPU 12 is in the CPU high priority state. At block 100, the CPU 12 assumes the high priority state due to either a system reset or three consecutive grants the arbiter 42 to bus agents coupled to the peripheral bus 32.

At block 102, the arbiter 42 is notified of a request from a bus agent coupled to the peripheral bus 32. Thereafter, at decision block 104 the arbiter 42 determines whether the latency timer contained in the resource allocation timers 40 has expired. If the latency timer has expired at decision block 104 then control proceeds to block 108. At block 108, the arbiter 42 causes the peripheral bus interface 46 to assert a grant to the requesting peripheral bus agent coupled to the peripheral bus 32. Thereafter, at block 110 the arbiter 42 sets the CPU 12 to the CPU low priority state.

If the latency timer has not expired at decision block 104, then control proceeds to block 106. At block 106, the arbiter 42 determines whether the CPU watchdog timer of the resource allocation timers 40 has expired. The CPU watchdog timer is reset with a predetermined watchdog timer value whenever a request for a system resource is received over the host bus 30. An expired CPU watchdog timer at decision block 106 indicates an idle period for requests from the CPU 12. If the CPU watchdog timer has expired at decision block 106, then control proceeds to block 108 to grant the peripheral bus 32 to the requesting peripheral bus agent and to set the CPU 12 to the CPU low priority state at block 110.

Figure 6:
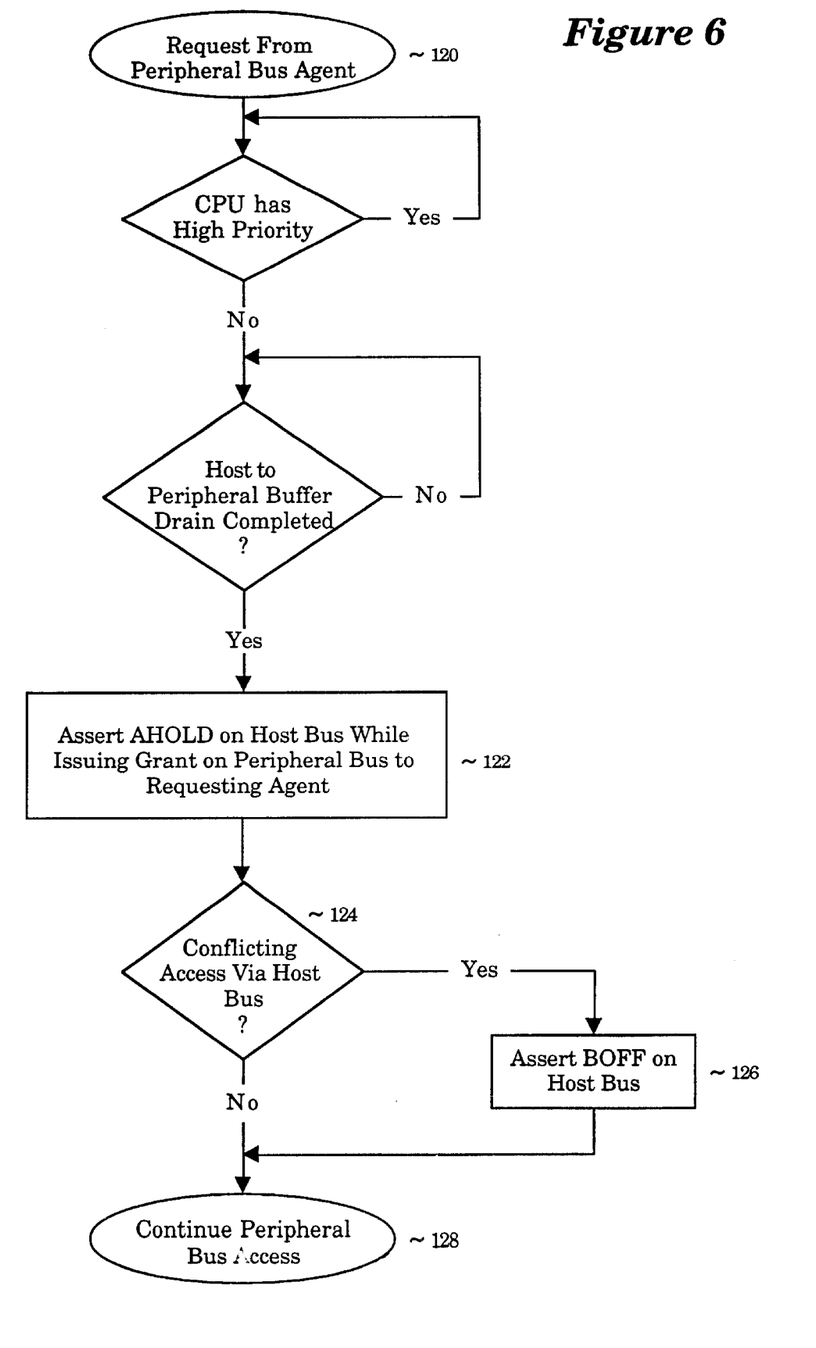
FIG. 6 illustrates a bus preemption mechanism for the host bus that is employed by the host bridge circuit.

FIG. 6 illustrates a bus preemption mechanism for the host bus 30 that is employed by the host bridge circuit 14. The arbiter 42 employs the bus preemption mechanism shown to prevent conflicts between concurrent accesses for system resources such as the main memory 16 or the peripheral bus 32 that originate via the host bus 30 and the peripheral bus 32.

At block 120, the arbiter 42 senses a request from a peripheral bus agent coupled to the peripheral bus 32. The arbiter then waits for the CPU 12 to exit the CPU high priority state, and waits for any pending writes posted in the buffer 52 to drain. Thereafter, at block 122 the arbiter 42 causes the host bus interface 44 to assert the AHOLD signal on the host bus 30 while causing the peripheral bus interface 46 to issue a grant over the peripheral bus 32 to the requesting peripheral bus agent. The AHOLD signal on the host bus 30 causes the CPU 12 to finish up the current transaction on the host bus 30 and to relinquish control of the next address bus cycle over the host bus 30.

Thereafter, at decision block 124 the arbiter 42 determines whether a conflicting access to the request granted on the peripheral bus 32 is received via the host bus 30. If a conflicting access via the host bus 30 is received at decision block 124, then control proceeds to block 126. At block 126, the arbiter 42 causes the host bus interface 44 to assert a back-off (BOFF) signal over the host bus 30. The BOFF signal causes the CPU 12 to immediately relinquish control over the host bus 30 and terminate the conflicting access. On the other hand, if a conflicting access via the host bus 30 is not detected, then control proceeds to block 128 to continue the normal processing of the peripheral bus request granted during block 122.

For one embodiment, the peripheral bus 32 conforms to a published peripheral component interface (PCI) standard bus specification. The PCI bus standard provides that each of the peripheral bus agents 20–26 implement a master latency timer initiated by a FRAME control signal on the peripheral bus 32. The peripheral bus interface 46 deasserts the grant signal on the peripheral bus 32 upon detection of the FRAME signal on the peripheral bus 32 from the requesting peripheral bus agent. Thereafter, the master latency timer in the requesting peripheral bus agent expires and causes the requesting peripheral bus agent to release control of the peripheral bus 32. Thereafter, the arbiter 42 rearbitrates accesses to system resources including the main memory 16 and the peripheral bus 32 that originate from both the host bus 30 and the peripheral bus 32. Such an early deassertion of the peripheral bus 32 grant by the peripheral bus interface 46 ensures regularly occurring rearbitration cycles for system resources without the need for specific processor request indication from the CPU 12 to the host bridge circuit 14.

Figure 7:
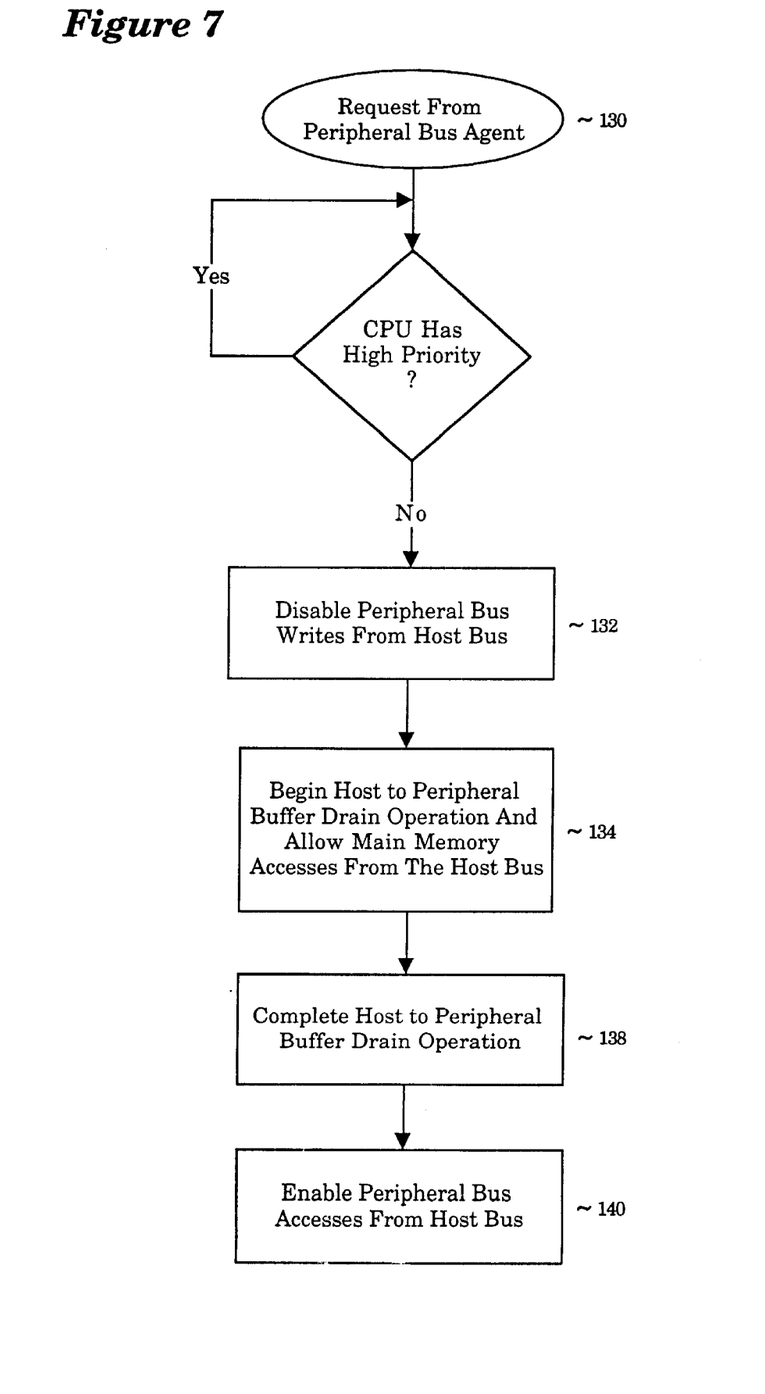
FIG. 7 illustrates the management of the host to peripheral buffer in the host bridge circuit during accesses to the main memory that originate via the peripheral bus.

FIG. 7 illustrates the management of the host to peripheral buffer 52 in the host bridge circuit 14 during accesses to the main memory 16 that originate via the peripheral bus 32. At block 130, the arbiter 42 receives a request from a peripheral bus agent coupled to the peripheral bus 32 that targets the main memory 16.

Thereafter at block 132, the arbiter 42 causes the host bus interface 44 to disable write accesses received over the host bus 30 that are targeted for an agent coupled to the peripheral bus 32. In such a manner, the CPU 12 is prevented from posting more data into the host to peripheral buffer 52 during a buffer drain operation.

At block 134, the arbiter 42 begins draining the host to peripheral buffer 52 to the appropriate target bus agents coupled on the peripheral bus 32 through the peripheral bus interface 46. While the PCI to peripheral buffer 52 is being drained to the peripheral bus 32, the arbiter 42 causes the host bus interface 44 to allow accesses to the main memory 16 that originate on the host bus 30.

At block 138, the drain of the host to peripheral buffer 52 completes. Thereafter at block 140, the arbiter 42 reenables peripheral bus accesses from the host bus 30 by allowing new data to be posted to the host to peripheral buffer 52 from the host bus 30.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are accordingly to be regarded as illustrative rather than a restrictive sense.

What is claimed is:

1. A computer readable medium that provides instructions, which when executed on a processor, cause the processor to perform operations comprising:

defining a first priority scheme for requests to access a system resource and a peripheral bus via a host bus and a second priority scheme for requests to access the system resource via the peripheral bus;

arbitrating between a host bus request and a peripheral bus request to designate a first priority request and a second priority request based upon the first priority scheme and the second priority scheme; and providing access to the system resource for the first priority request while processing any one of the second priority request, a host bus request to access the peripheral bus, and a transaction between at least two of the bus agents.

2. The computer readable medium of claim 1, wherein the instructions further comprise preempting the CPU by asserting an AHOLD signal on the host bus while asserting a grant signal to a requesting bus agent on the peripheral bus and by asserting a BOFF signal on the host bus in response to a transaction on the host bus that conflicts with a transaction from the requesting bus agent.

3. The computer readable medium of claim 1, wherein the first priority scheme for host bus requests comprises a CPU high state and a CPU low state and wherein providing a separate set of priority classes includes granting priority to a host bus request while in the CPU high state and granting priority to a peripheral bus request while in the CPU low state.

4. The computer readable medium of claim 3, wherein the instructions further comprise granting priority to the host bus request if no requests from the peripheral bus are active while in the CPU low state.

5. The computer readable medium of claim 3, wherein a programmable latency timer determines an amount of time that the CPU stays in the CPU high state.

6. The computer readable medium of claim 3, wherein a programmable watchdog timer indicates an activity time for the CPU such that the arbiter moves the CPU to the CPU low state if the watchdog timer expires.

7. The computer readable medium of claim 1, wherein the instructions further comprise draining a buffer for posting data for transfer from the CPU to one of the bus agents before granting access to the system resource via the peripheral bus.

* * * * *